(12) United States Patent
Bennett et al.

(10) Patent No.: US 7,290,001 B2
(45) Date of Patent: Oct. 30, 2007

(54) IDENTIFICATION AND ENUMERATION OF DATA COMPONENTS IN A TRIE

(75) Inventors: John R. Bennett, Redmond, WA (US); Gregory N. Hullender, Kirkland, WA (US); Donald D. Karlov, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/732,771

(22) Filed: Dec. 9, 2003

(65) Prior Publication Data

US 2004/0122836 A1 Jun. 24, 2004

Related U.S. Application Data

(62) Division of application No. 09/390,182, filed on Sep. 7, 1999, now Pat. No. 6,675,169.

(51) Int. Cl.
*G06F 17/30* (2006.01)
(52) U.S. Cl. .............................. 707/101; 707/2; 707/3; 707/4; 707/5; 707/6
(58) Field of Classification Search ................ 707/100, 707/101, 102, 104.1, 2, 3, 4, 5, 6; 704/9, 704/10
See application file for complete search history.

(56) References Cited

OTHER PUBLICATIONS

Knuth, Donald E., The Art of Computer Programming vol. 3 Sorting and Searching, Copyright 1998 by Addison-Wesley, Second Edition, pp. 492-507.*

\* cited by examiner

*Primary Examiner*—Hung Q Pham

(57) ABSTRACT

A method and improved data structure for attaching information to words in a trie of nodes. Each node of a trie includes a single tag bit which is interpreted according to information specified in a header of the trie. The information may specify that a node may be tagged with multiple tags, whereby if the tag bit is set in a given node, the node further includes a bitmask indicating which one or ones of the tags apply to that node. A value mask may be provided in the header indicating which of the tags (if any) have values associated therewith, whereby information representative of the value such as the value itself or a pointer thereto is stored in each node tagged with at least one tag having an associated value. Partial enumeration of tagged nodes may be provided by storing a count of the number of tagged words under a node, wherein if a trie has multiple tags, each tag may be selectively and separately enumerated as specified in header information. Partial enumeration may be combined with global enumeration of each word, with multiple tags, and/or with tags that have associated values.

15 Claims, 12 Drawing Sheets

IDENTIFICATION AND ENUMERATION OF DATA COMPONENTS IN A TRIE

CROSS-REFERENCE TO RELATED APPLICATION

This application is a division of U.S. patent application Ser. No. 09/390,182, filed Sep. 7, 1999 now U.S. Pat. No. 6,675,169.

FIELD OF THE INVENTION

The invention relates generally to computer systems, and more particularly to an improved method and system for storing lexical data and attaching information thereto.

BACKGROUND OF THE INVENTION

A trie is a data structure that is useful for compressing lexical data such as a list of dictionary words. Tries are composed of states, with a top-level state representing, for example, each of the first letters (e.g., a-z) of all valid words in a given dictionary. Each state is comprised of nodes, wherein each node represents a valid letter in that state, along with some information about that letter, such as a pointer to a lower state (if any). Each state represents a transition from one character in a word to the next. For example, the letter "q" in one state usually transitions to the letter "u" in a next lower state.

To use the trie, such as to find if a user-input word is a valid word in the dictionary, a search through the states is performed. For example, to find the word "the," the top-level state in the trie is searched until the "t" node is found, and then a next lower level state pointed to by the "t" node is searched to determine if there is an "h" node therein. If not, the word "the" would not be a valid word in that dictionary. However, if there is an "h" node in the state pointed to by the "t" node, the "h" node is examined to find a next state, if any. The state pointed to by the "h" node is then searched to find out whether there is an "e" node therein. If there is an "e" node, to be a valid word, the "e" node needs to be followed by some indication (e.g., a flag) indicating that a valid word exists at this time, regardless of whether the "e" node points to a further state. In a trie-structured dictionary that properly represents a list of words in the English language, "the" would be a valid word, and thus the top-level state would have a "t" node, the next state pointed to by the "t" node would have an "h" node therein, and the state pointed to by that "h" node would have an "e" node therein with a valid flag set. If characters such as "thj" were searched, however, the "t" node would transition to the next state which would have an "h" node therein, but the next state pointed to by "h" node would not include a "j" node, and thus this word would not be a valid word.

While storing words in a trie structure is efficient in terms of both storage and access time, it is difficult to attach information to individual words in the trie. One known way to attach information to certain individual words stored in a trie is to tag selected words by setting a single "tag" bit in the last node of each selected word. Tagging is useful for identifying a small or regular subset of words for special processing upon decompression. For example, some words are slang words, which although acceptable (e.g., to a spell checker), are not recommended (e.g., by a thesaurus). If a trie is used to store words, the slang words can be tagged, whereby upon decompression, those words stand out from the rest. Then, the spell checker may ignore the tag, while the thesaurus may recognize the tag and thereby delete or change the appearance of the word in a list of synonyms presented to a user.

Another technique for associating information with words is known as global enumeration. Global enumeration is a technique that maps each word in the word list to a number and maps that number back to the same word, i.e., the number may be used to determine its associated word, and vice-versa. The numbers are dense, e.g. if there are N words in the list, then the words map to the range zero to N minus one. The number may serve as an index to information associated with specific words, which is useful if the same type of information is attached to every (or most) words in the list with little or no pattern. For example, the words in a thesaurus may be stored in a trie and enumerated, whereby the number associated with each word may serve as an index to a table of synonyms, a table of antonyms and so on. The tables themselves may be lists of numbers representing associated words that map back to the trie. By way of example, the user may want a synonym for a word that is enumerated in the trie as 957, whereby 957 is used as an index to a table of synonyms, resulting in the numbers 2040, 902 and 457 being retrieved. Those retrieved values are then used to find their corresponding words in the trie for display to a user.

While tagging and enumeration are thus helpful techniques, they are essentially limited to solving only their specific types of problems, i.e., marking certain words, or associating each of the words in a trie with a unique indexing number. Thus, these solutions work in certain circumstances, however there are many word lists that would benefit from having additional information stored with the word, and the existing techniques are neither flexible enough nor extensible to solve the problem in an efficient manner. For example, certain languages have gender associated with certain words, but not all words. Thus, a single bit is not sufficient to represent male, female or gender neutral. Separately tagging more than one subset of words can be done by setting aside an additional bit in each node for each additional subset, (e.g., one bit for gender or not, one bit for male or female), however reserving such tagging bits in each node reduces compression. While enumeration could be used to store the related gender information in an indexed table, enumeration requires the storing of numbers with the nodes, which in some instances is very inefficient, such as if enumeration is not otherwise needed and only a few words need such associated information.

SUMMARY OF THE INVENTION

Briefly, the present invention provides a method and system and accompanying data structure for the improved attaching of additional information onto words in a trie. The present invention is generally accomplished by providing a framework within the trie data structure capable of storing multiple tags with individual words, wherein some or all of the tags may further have associated values, and/or by separately enumerating some or all the subsets of tagged words (partial enumeration) in the trie, independent of whether global enumeration of all words is in use. To accomplish multiple tagging, the single tag bit on the last node of a word may be interpreted in a new way, as specified by information placed in a header of the trie. If set, it indicates that a further block of bits (e.g., a byte) is included in the node, which comprises a bitmask specifying which of a plurality of tags are set on that particular node. Header information may also specify which (if any) of the tags have associated values, which are then stored in association with each node having such a tag.

Partial enumeration of tagged items is provided by storing a count of the tagged words under a node. Multiple tags may be selectively and separately enumerated. Header information indicates how the enumeration is arranged, e.g., which of the plurality of tags are enumerated. Partial enumeration may be combined with global enumeration, with multiple tags, and/or with tags that have values, providing a flexible, extensible and efficient way to attach information to words in a trie.

Other advantages will become apparent from the following detailed description when taken in conjunction with the drawings, in which:

DETAILED DESCRIPTION OF THE PREFERRED EMBODIMENT

Exemplary Operating Environment

Figure 1:
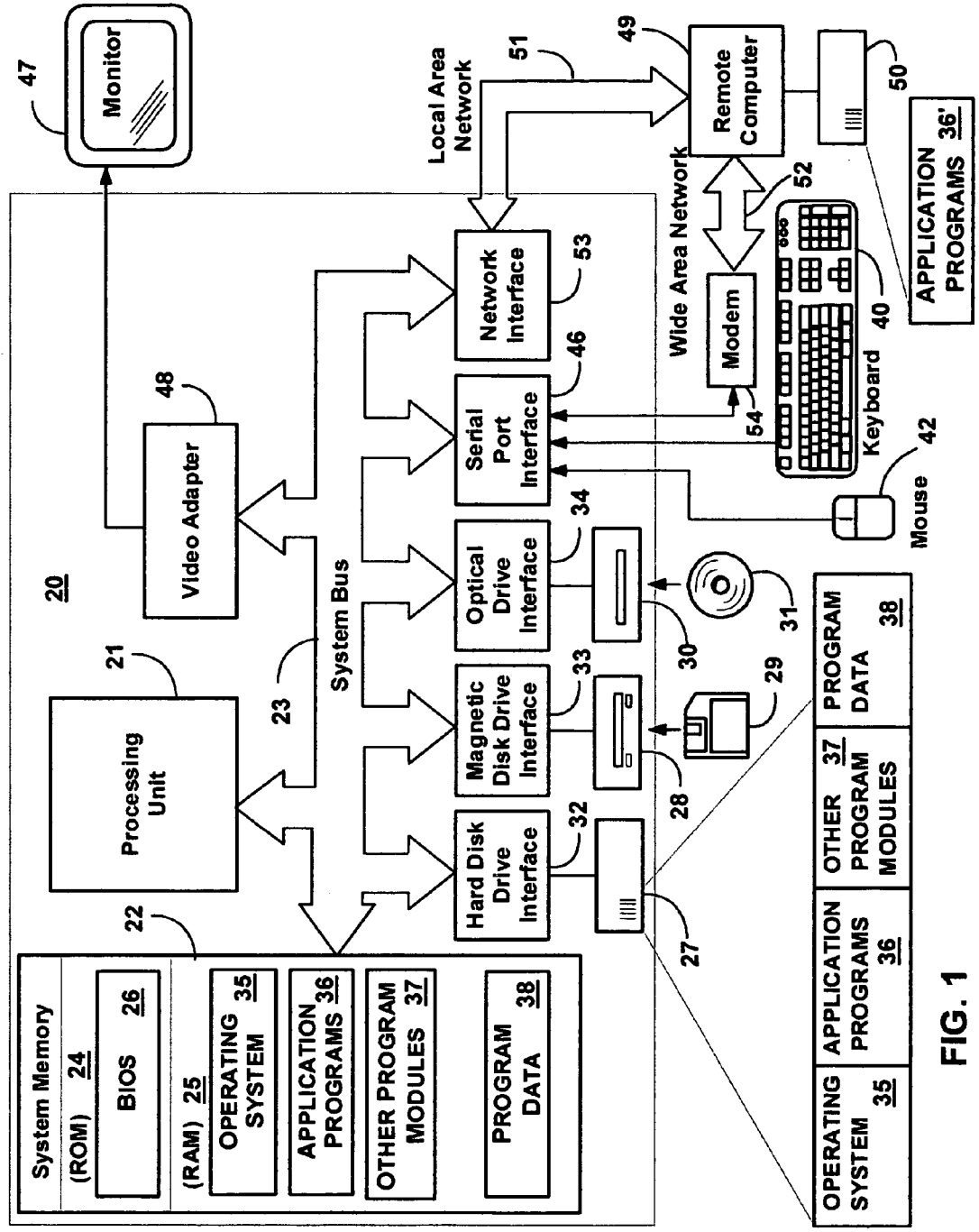
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMS) and the like may also be used in the exemplary operating environment.

A number of program modules may be stored on the hard disk, magnetic disk 29, optical disk 31, ROM 24 or RAM 25, including an operating system 35 (preferably Windows NT), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

General Tagging and Enumeration

Figure 2:
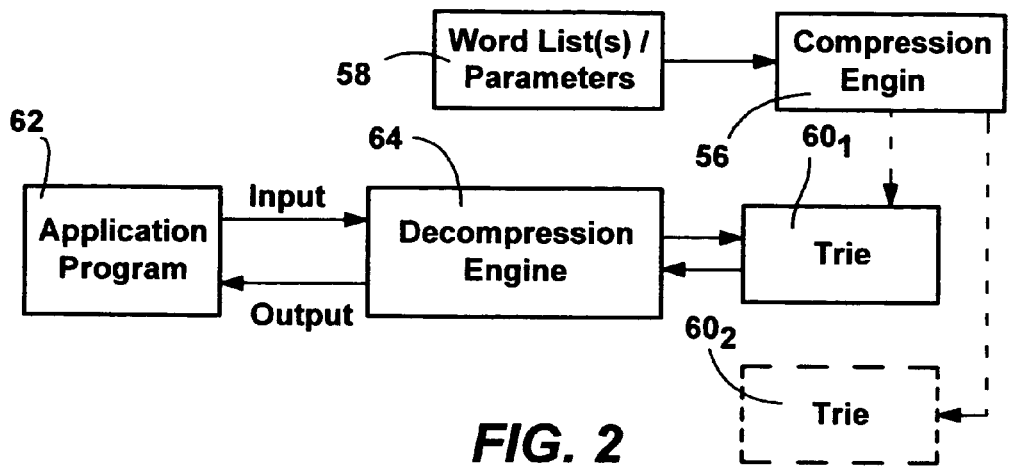
FIG. 2 is a block diagram representing exemplary components for generating and then utilizing a trie structure.

As generally represented in FIG. 2, a compression engine 56 generates tries from one or more word lists and other parameters 58 input thereto, e.g., the compression engine generates the tries $60_1$ and $60_2$. Then, once the trie or tries are generated, the compression engine 56 generally is separated from the tries $60_1$, $60_2$, as represented by the dashed arrows in FIG. 2. For example, the tries $60_1$ and $60_2$ are shipped with some product, such as for use by an application program 62, but the compression engine 56 is not shipped therewith.

FIG. 2 also generally represents how a trie $60_1$ is ordinarily used, wherein in response to some input, such as from the application program 62, a decompression engine 64 accesses the trie structure $60_1$ and returns a suitable output. As described below, the input is typically representative of a word, such as a string of text or a number representing a word. The output is some information related to the input, such as the word itself, a number representing the word, or some value related to the word. For example, a word processing application may provide a string of text to a decompression engine 64, whereby the decompression engine 64 searches the trie $60_1$ and returns a TRUE value if the word is present in the trie $60_1$ and a FALSE value if not present. As can be readily appreciated, such a trie $60_1$ may comprise a list of correctly spelled words, whereby the decompression engine 64 and the trie $60_1$ respectively serve as a spell checking mechanism and dictionary. Simply by substituting the trie $60_1$ with another trie (e.g., represented by the dashed box $60_2$), such as a trie that stores the words of another language, the same decompression engine 64 may be used to spell-check that other language.

Figure 3:
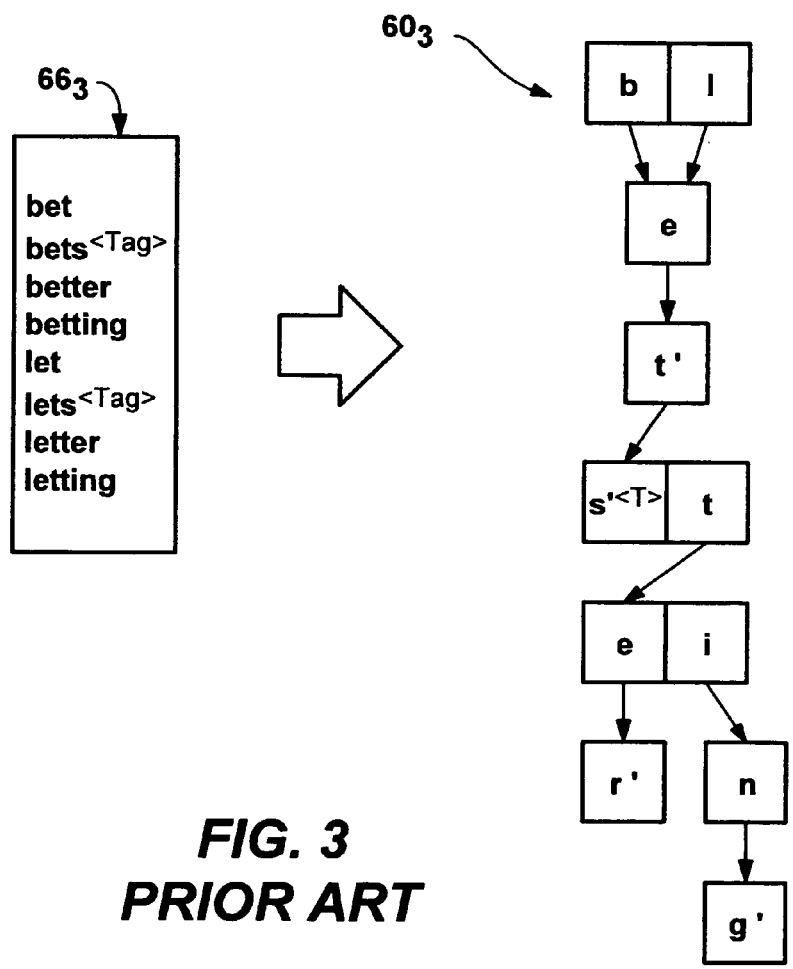
FIG. 3 is a representation of an alphabetically ordered trie-structured dictionary according to the prior art for a very small list of words, wherein simple tagging is used.

By way of background of tries, FIG. 3 shows a trie-structured dictionary $60_3$ according to the prior art that stores a small list $66_3$ of eight words. In FIG. 3, (and in other similar drawings herein), the trie $60_3$ is shown as an arrangement of states of nodes, wherein each node is represented by a box surrounding a character, with the states shown as groups of one or more nodes. In FIG. 3, if more than one node is in a state, the boxes representing the nodes of that state are shown in contact with one another. Transitions from a node to a next state are represented by pointers, shown as arrows between states and lower-level states in FIG. 3. Also in FIG. 3, nodes that end a valid word are indicated by an apostrophe (') following each such node's letter, the apostrophe representing a "valid" flag that is set in a flags field in the node to indicate when a valid word exists.

As shown in FIG. 3, to reduce the number of nodes in a trie, compression technologies may use pointers to exploit similarities in words to share one or more nodes. For example, in FIG. 3, the "b" node and the "l" node in the top-level state share the "e" and "t" nodes below, while the endings of the words ("s", "er" and "ing") have similarly been merged. Thus, in FIG. 3, the top-level state comprises "b" and "l" nodes, representing the characters that can start a valid word of the word list $66_3$. Each of those nodes transitions to a lower "e" state representing the next character in the valid words. For example, to find if the word "bet" is valid in the dictionary, the top-level state is first searched to find if "b" is a valid start of a word. The "b" node transitions to another (lower) state having an "e" node therein, and thus a search of this next state indicates that the "b" node is followed by an "e" node, so the word "bet" is still possibly valid. The "e" note transitions to another (lower) state having a "t'" node therein, (where the apostrophe indicates that the "t" completes a valid word), and thus a search of this state indicates that "bet" is a valid word.

Simple tagging is represented in FIG. 3 by the superscript symbol "<T>" in the trie $60_3$, wherein the words ending in "s" ("bets" and "lets") have been specially tagged by setting a tag bit in the "s'$^{<T>}$" node to indicate the tagging. Upon decompression of the "s'$^{<T>}$" node, the decompression engine 64 detects the tag and performs whatever processing it desires based on the presence of the tag in the decompressed word. Note that if "bets" was tagged and "lets" was not, ending compression would not allow a single "s'" node to be shared (as in FIG. 3) because of the bit difference. As a result, tagging is frequently inefficient when there are a large number of tagged words that do not follow any general pattern.

Figure 4:
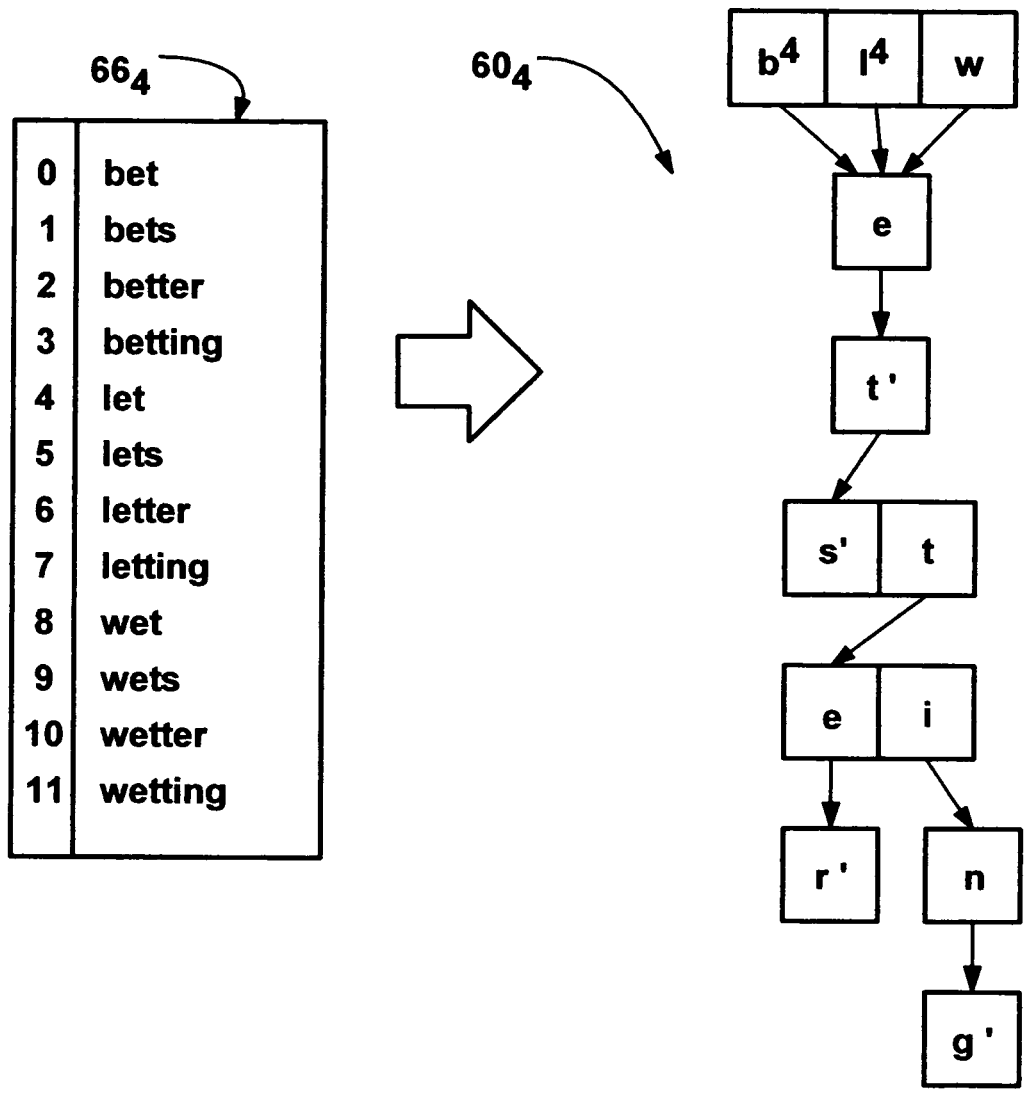
FIG. 4 is a representation of an alphabetically ordered trie-structured dictionary according to the prior art for a very small list of words, wherein global enumeration is used.

Global enumeration according to the prior art is generally shown in FIG. 4, wherein a trie-structured dictionary $60_4$ having alphabetically arranged states stores a small list $66_4$ of twelve words. In FIG. 4, a unique number is associated with each word in the list $66_4$, shown to the left of the word. This number corresponds to a global enumeration count that is present in some of the nodes (not necessarily limited to those in the top-level state) indicating the number of words under that node. For example, the nodes "b" and "l" each have an enumeration count of four stored therewith, indicating that the "b" node and "l" node each have four words thereunder. For efficiency, a single bit in each node tells the decompression engine 64 whether a given node has an global enumeration count therein, whereby only nodes having such a count need to have the additional bits reserved for storing the count.

To quickly find the word in the trie $60_4$ that is associated with a given number, rather than following and counting each path in the trie $60_4$ until the given number is reached, the decompression engine 64 searches by using the enumeration counts. To this end, the search looks at the enumeration count of the node with respect to the given number to determine if the word is under that node. By way of example, to find the word in the trie $60_4$ that is associated with the number six (6), the first node is looked at and determined to have the first four words (words zero to three) thereunder. Thus, it is known that this node need not be searched downwardly to find the word, and also, it is known that four words have been effectively searched, leaving three words remaining. For purposes of simplifying the math, since the numbering is zero-based, the word identified as "six" first may be incremented to seven, since it is really the seventh word being sought, i.e., seven (six plus one) minus four leaves three more words to search.

The next node, the "l" node has a four enumeration count, and thus the associated word is known to be under this node, since only three more words need to be searched and there are four under the "l" node. The first word under this node, (the fifth word overall corresponding to an index of four) as determined by the valid word bit indicated by the apostrophe in FIG. 4, is "let." Searching down and then across, the second word, is "lets." The third word under the "l" node, which is the seventh word overall, (indexed by six), is "letter," whereby the search is complete and the decompression engine 64 may return some information about the sixth indexed word, (e.g., the text string "letter"). Note that other nodes below the top-level state may also include enumeration counts therein, so that lower paths need not be unnecessarily traversed, however it is often more efficient to not attach an enumeration count if the count is below a certain threshold. This causes the search to be slower since it needs to follow and count additional paths, but reduces the size of the trie, and thus the threshold value may be used and adjusted in a size versus speed tradeoff to meet a particular need. Further, note that the last node in a state (e.g., the "w" node) is never skipped over, and thus it is unnecessary (and consequently inefficient) to store an enumeration count therewith.

To find the number of a word, the decompression engine 64 essentially reverses the process. For example, to determine the number associated with the word "wets," the process determines that "wets" is the second word under the "w" node. The enumeration counts of the previous nodes at the top-level state are then summed with that two count, (if an enumeration count is not present in a node of the top-level state, the words under that node need to be individually counted), and the sum is decremented, since zero-based. Thus, for the second word under the "w" node, "wets," two, plus four under the "l" node, plus four under the "b" node minus one equals nine as the index value for "wets."

Improved Trie Tagging and Enumeration

Turning to FIGS. 5-14, in accordance with aspects of the present invention, a system and method are provided to facilitate improved and multiple tagging of tries, along with improved enumeration of tries. In general, a first aspect of the present invention enables the use of multiple tags in an efficient manner, such that different subsets of words may be made to stand out from the rest of the words. As will be understood, efficiency is provided in that nodes that are not tagged do not include multiple tag bits, e.g., for a trie in which only a few words are tagged with one or more tags from a plurality of available tags, there is only a slight increase in the total size of the trie. At the same time, an improved trie data structure framework is provided in which simple one-bit tagging may be handled by the same decompression engine 64, with only a negligible increase in trie size.

Figure 5:
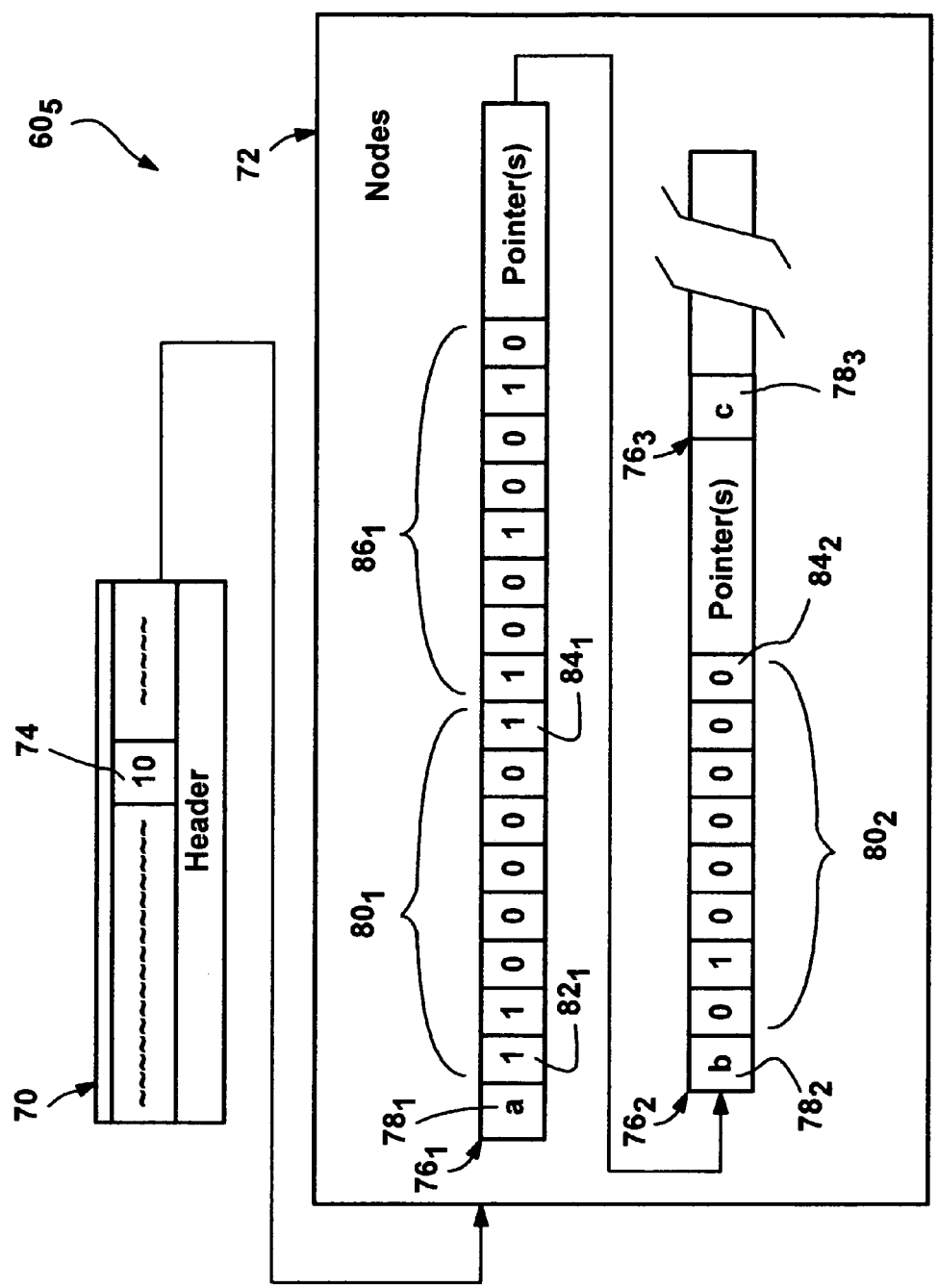
FIG. 5 is a representation of a header and two nodes of a trie data structure, and showing the use of multiple tags in accordance with one aspect of the present invention.
Figure 6:
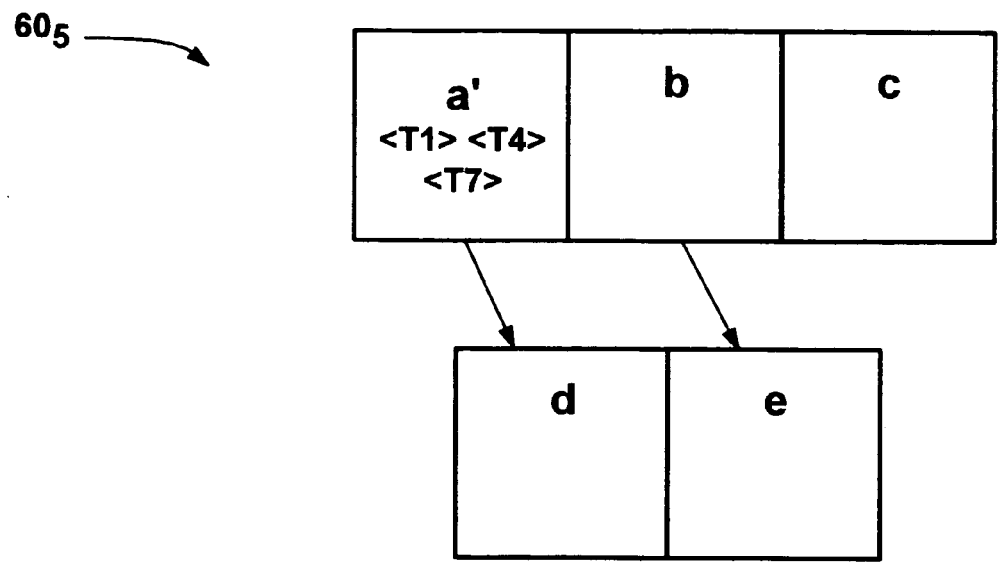
FIG. 6 is an alternative representation of a trie showing the use of multiple tags.

In accordance with one aspect of the present invention, to accomplish multiple tagging, the bit normally used to tag a node with a simple tag is interpreted differently by the decompression engine 64. As generally represented in FIG. 5, a trie $60_5$ includes a header section 70 and a node section 72 comprising a plurality of nodes, $76_1$, $76_2$, $76_3$ and so on. To instruct the decompression engine 64 as to the type of tagging the particular trie $60_5$ is using, the header 70 includes a tag information field 74 of two or more bits. For example, a zero (00b) in the field 74 means no tagging is being used in the trie, a one (01b) means simple one-bit tagging is in use, and a two (10b) means multiple tagging is in use in the trie $60_5$, (where the lowercase "b" following the digits indicates binary).

In general, as shown in FIG. 5, each node (e.g., $76_1$) includes a first field $78_1$ that identifies the character that the node represents, and a second field $80_1$ of flags that store information about how the node $76_1$ is to be decompressed and interpreted. The first and second fields $78_1$ and $80_1$ may, for example, each be a byte in length, or may be some other length or lengths known to the decompression engine 64 (or determinable thereby, i.e., from the header 70). The second field $80_1$ includes flags setting forth information such as whether the node $76_1$ is the last character of a valid word (valid bit $82_1$), whether the node has certain pointers to other nodes, (e.g., a down pointer), whether the node ends a state, and/or other additional flags that may be used in a given scheme.

In keeping with the present invention, one of the flags of the flags (second) field $80_1$ is the tag bit $84_1$. In general, if a node has its tag bit $84_1$ set equal to one, then the decompression engine 64 knows via the header's tag information field 74 how to interpret this bit. More particularly, if the tag information field 74 equals one (01b), then the tag bit $84_1$ is interpreted in its simple one-bit form, i.e., if the tag bit $84_1$ is set to one, the word is included in the subset of tagged words, else it is not included. Note that if tag information field 74 equals zero (00b), then tagging is not present in the trie and the location of the tag bit $84_1$ may be used for some other purpose.

In accordance with one aspect of the present invention, when the tag information field 74 equals two (10b), as shown in FIG. 5, the decompression engine 64 knows that multiple tagging is present. When the tag bit $84_1$ is set and multiple tagging is present, the node $76_1$ includes an additional multiple tag mask field $86_1$, including a plurality of bits, (e.g., a byte), used for tagging the node $76_1$. Note that to save space, at least one of the plurality of tag bits is set to one in the multiple tag mask $86_1$, otherwise the entire field is not needed. As a result, only tagged words have the extra mask field $86_1$. Note that the tag bit $84_1$ is generally only set at the end of a valid word, i.e., in nodes that have the valid bit (e.g., $82_1$) set to indicate a valid word, however it is feasible to have a system wherein one or more tags are in a node that is not at the end of a word. For example, the word "patent" may be tagged in its "n" node, whereby "patenting" would be similarly tagged with one or more tags, but a word such as "rating" could share the "ting" ending without being tagged.

In FIG. 5, the multiple tag mask field 86₁ is eight bits (one byte) in length, although a different length is feasible as long as the decompression engine 64 knows the length, e.g., the header 70 may store the length if the length varies from trie to trie. As represented in FIG. 5 and also as alternatively represented in FIG. 6, reading the mask 86₁ from left to right starting at one, the node 76₁ is tagged with three tags, tags one, four and seven (<T1>, <T4>, and <T7>). Accordingly, the decompression engine 64 sends information back to the application 62 or the like indicating that the word is in the first, fourth and seventh subsets. As also shown in FIG. 5, another node 76₂ has its tag bit 84₂ cleared to zero, which means that this node 76₂ is not tagged and thus there is no tag mask therein, improving compression efficiency as described above.

Figure 7:
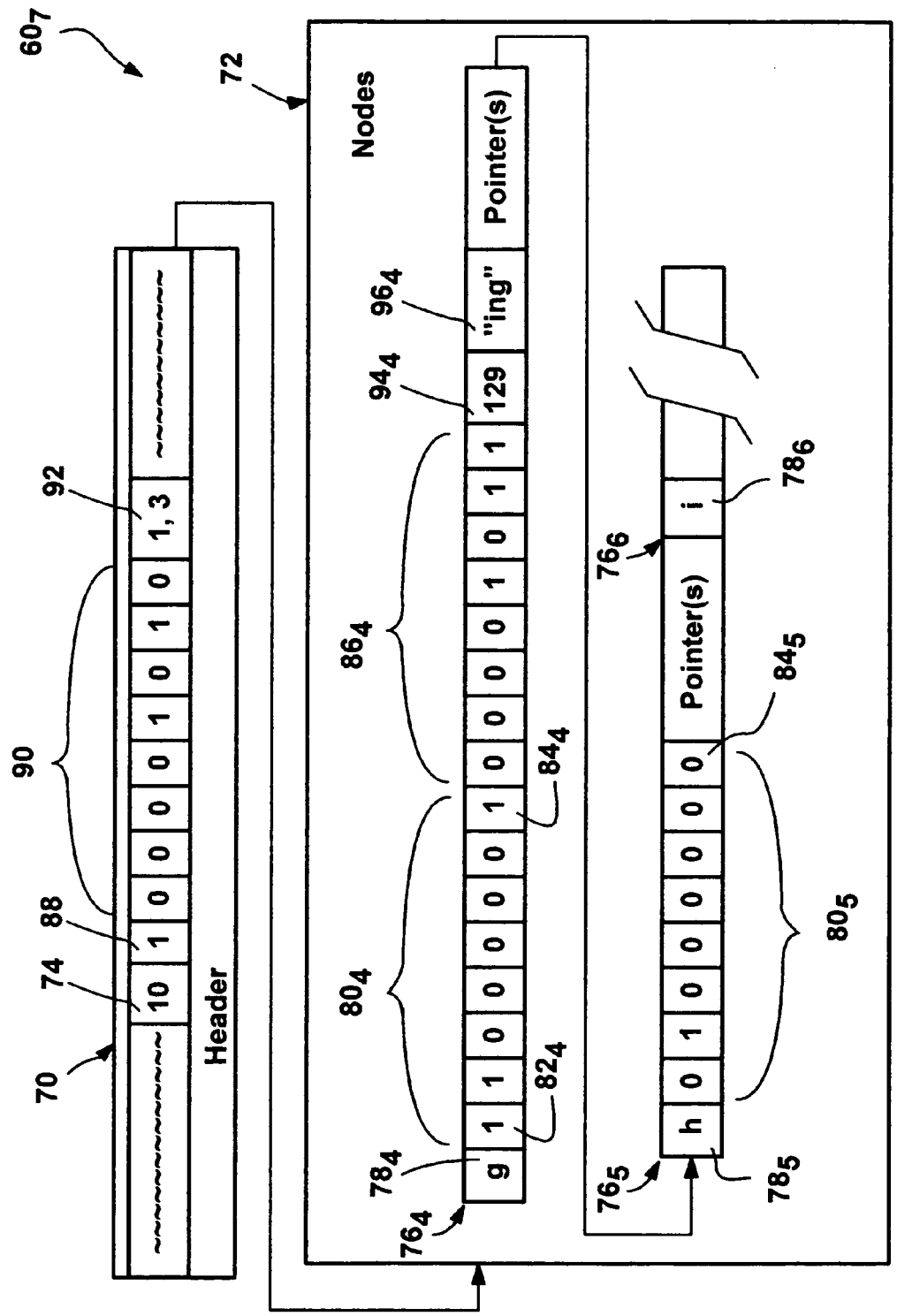
FIG. 7 is a representation of a header and two nodes of a trie data structure, and showing the use of multiple tags with associated values, in accordance with one aspect of the present invention.

In accordance with another aspect of the present invention, a word may be tagged with one or more tags, and each of those tags may have a value associated therewith that may be unique to the tagged node. For example, a word such as "sail" may be tagged with values in its "l" node that provide valid word endings such as "s," "ed," or "ing," and/or may be further tagged to provide some other information, e.g., the root form "sail" is both a noun and a verb. To accomplish tagging while having a value associated with at least one tag, FIG. 7 shows a trie 60₇ having a header section 70 and a node section 72, wherein the header tag information includes a tag value field 88 indicating that tagging with at least one associated value is in use in the trie 60₇. The tag information field 74 indicates that multiple tags are in use as described above. Note that the tag information field 74 may include the tag value field 88 as part thereof, and indeed, the tag information field 74 may be made a byte or more in length to maintain such information and other tag-related information that may be added in the future.

The header also includes a value mask field 90 that indicates which of the tags have values associated therewith. For example, in FIG. 7, counting from left to right beginning at one, the field 90 provides the decompression engine 64 with information that the fifth tag has a value associated therewith, as does the seventh tag. The values may be limited to some fixed length such as a byte, or alternatively, the values may vary in length, e.g., by multiples of a byte. If the values may vary in length, a value size array field 92 includes an array of the sizes, such as the size in multiples of a byte. Thus, in FIG. 7, tag five's associated value is one byte long, while tag seven's associated value is three bytes long. The array 92 may alternatively store zeroes where associated values are not used, i.e., the array may be "0,0,0,0,1,0,3,0" whereby the value size field 92 makes the value mask field somewhat unnecessary, since wherever a non-zero length is stored, the tag is known to have a value. Note that a bit (e.g., another bit in the tag information field) may be reserved for informing the compression engine 64 as to whether the value sizes are fixed at one byte (or some other default size) in a given trie, or whether the sizes are variable, whereby the size array field 92 is present.

In FIG. 7, the "g" node 76₄ has its tag bit 84₄ set to one, indicating that the tag mask field 86₄ is present in this node. The tag mask 86₄ indicates that the node 76₄ is tagged with tags five, seven and eight. Because of the information in the header value bitmask 90, the decompression engine 64 knows (e.g., by a logical AND of the header value mask field 90 and the tag mask 86₄, and summing the one bits) that in this node 76₄, two values follow the tag mask 86₄. The first value is associated with the tag five and is found in a one-byte value field 94₄. The second value is in a three-byte value field 96₄ associated with the tag seven. For example, the one-byte value in the field 94₄ is shown as associating a value of 129 with tag five, while the three-byte value in the field 96₄ is shown as associating the string "ing" with tag seven, wherein the quotes indicate that text (e.g., the ASCII values thereof) is stored. Note that the associated value can either be stored literally in the trie, or for example, a byte Huffman table can be used to encode the value, depending on the size and data distribution. If a trie supports both, then the header further needs to specify which method was used for each tag. In any event, the tag eight is a one-bit tag with no associated value, placing this word in some subset category of other words tagged with tag eight.

Figure 8:
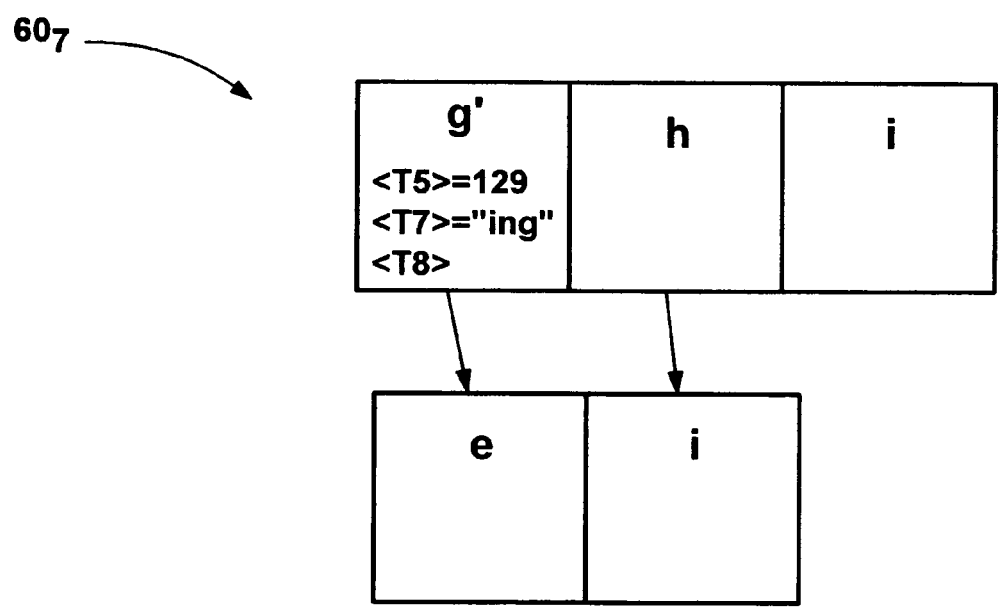
FIG. 8 is an alternative representation of a trie showing the use of multiple tags with associated values.

Thus, upon decoding the "g" node 76₄ of the trie 60₇, the decompression engine 64 determines that the node 76₄ ends a valid word, and is tagged with tag five having an associated value of 129, tag seven having an associated value of "ing" and tag eight, as generally shown in FIG. 8. An application 62 (FIG. 2) or the like may use this information as desired. For example, tag eight may indicate the word is both a verb and a noun, tag five may be an index to a table of images, whereby an image numbered 129 may be displayed in conjunction with this word, and tag seven indicates that adding "ing" to the word provides the valid present-tense form thereof. In contrast, as also represented in FIG. 7, the "h" node 76₅ does not have its tag bit 84₅ set, and thus has no subsequent tag mask field, and consequently no associated values are possible or present. As can be appreciated, the framework of the present invention is extremely flexible for attaching information to words.

Figure 9:
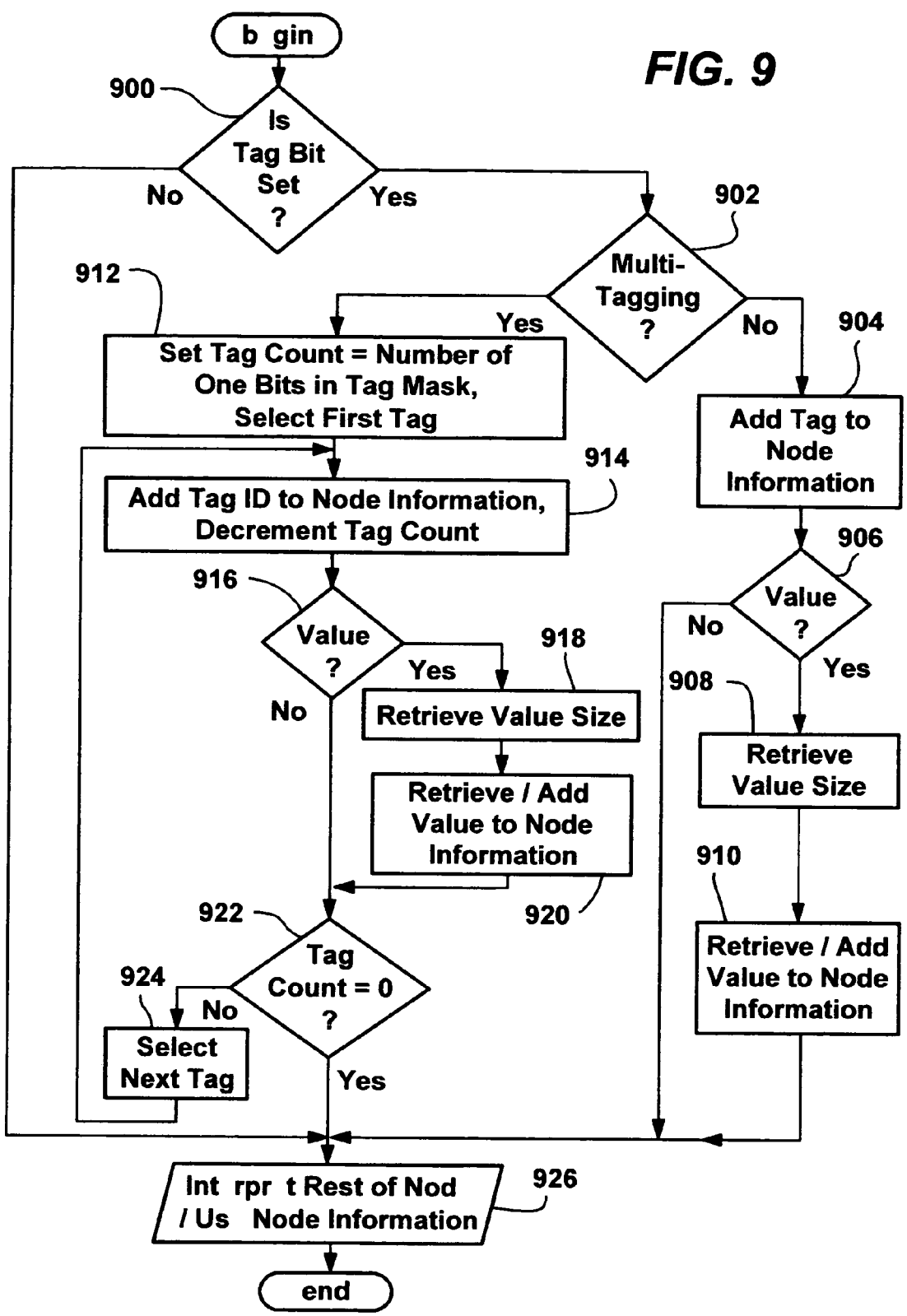
FIG. 9 is a flow diagram generally representing exemplary steps taken by a decompression engine to handle various types of tagging in a trie, in accordance with aspects of the present invention.

By way of example of how a decompression engine 64 may handle various types of tags as part of an overall decompression process, FIG. 9 represents general exemplary steps which may be taken to handle tags. Note that if the header tag information field 74 (FIG. 7) indicates that no tagging is present, the steps of FIG. 9 may be bypassed when decompressing a node, (whereby the "tag" bit position in the flags field may be used otherwise). When tagging is present, at step 900, the decompression engine 64 looks to the current node's flags field to determine if the node has its tag bit set. If no tagging is present for this node, no tag information is present, whereby the decompression process branches ahead to step 926 to otherwise interpret and decompress the rest of the node and/or use the node information, e.g., add the node's character to a text string to be returned.

If the tag bit is set for this node, step 900 branches to step 902 wherein the header tag information field 74 (e.g., FIG. 7) is evaluated to determine if the trie includes multiple tags. If not, step 902 branches to step 904 where a single tag is added to information associated with this node (or the word) in general, e.g., information that is to be returned to an application 62. Then, step 906 examines the header value information bit 88 (FIG. 7) to determine if any value is associated with this tag. If not, the process is done, and step 906 advances to step 926 to further interpret the node/use the information as described above. However, if a value is associated with the current node's tag, step 908 retrieves the size of the value from the value array information 92 in the header 70 (unless the size is predetermined) and step 910 obtains the appropriate value (e.g., from the byte following the node's flags) and adds it to the node information that is being accumulated for this node. Step 910 then continues to step 926 to perform any further processing as described above.

Returning to step 902, if this particular trie includes multiple tags, step 912 determines how many tags are present in this node, so that each may be appropriately handled. To this end, step 912 sums the number of one bits in the tag mask which is present in this node. Then the first tag (e.g., from left to right, the first high bit in the tag mask) is selected, (while maintaining which bit it is) and at step 914, a suitable ID therefor (e.g., <T5>) is added to the information being accumulated for this node, and the tag count decremented. Step 916 tests whether there is a value associated with this tag as described above, i.e., whether the value bit 88 is set in the header 70 (FIG. 7), and if so, whether the value mask 90 is set in the bit position corresponding to the bit position of the current tag. If not, step 916 branches ahead to step 922 to determine if all tags have been handled, as described below. If a value is associated with this tag, step 916 branches to step 918 where the size of the value from the value size information 92 in the header 70 is retrieved (if necessary). Step 920 then obtains the appropriate value and adds it to the node information that is being accumulated for this node.

Step 922 tests if the multiple flags set for this node have been handled, as determined by the flag count. If not, step 924 selects the next high bit in the tag mask (and maintains information as to which bit position that is), and the process repeats by returning to step 914 to handle this next bit. When at step 922 it is determined that the tags (high bits in the tag mask) have all been handled in the manner described above, the process is essentially complete, whereby step 922 branches to step 926 such as to use the accumulated information for this node as desired, or first perform some other process to decompress the rest of the node and accumulate additional information as appropriate.

In addition to and/or in conjunction with multiple tagging and tagging with values, the present invention enables additional information to be added to nodes through an extension to the concept of enumeration, sometimes referred to as "partial" enumeration. In partial enumeration, nodes that are tagged are counted, i.e., if a node has a partial enumeration count therein, the count stores the number of nodes that are tagged thereunder. An array of partial enumeration counts is used if partial enumeration of more than one tag in a set of multiple tags is specified. Partial enumeration may be used independently of whether global enumeration is in use.

Figure 10:
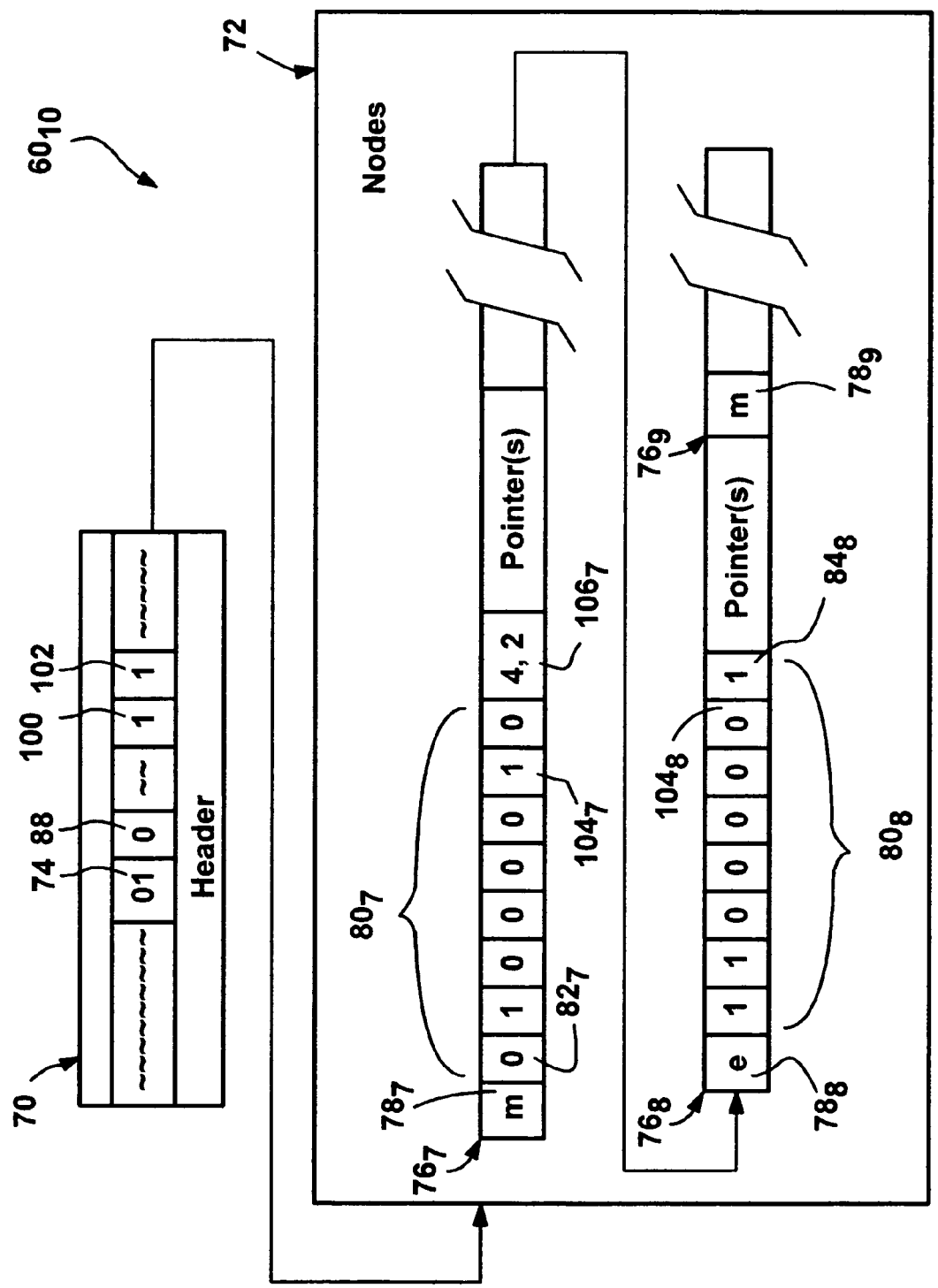
FIG. 10 is a representation of a header and two nodes of a trie data structure, and showing partial enumeration in combination with global enumeration and simple one-bit tagging in accordance with one aspect of the present invention.

FIG. 10 shows partial enumeration in conjunction with simple one-bit tagging, wherein global enumeration is also in use in a trie $60_{10}$. In FIG. 10, a header 70 includes information in the tag information field 74 indicating that the trie $60_{10}$ to which the header 70 belongs has simple one-bit tagging, as well as no value associated with that tag (via field 88). In this particular trie $60_{10}$, the header 70 also includes a global enumeration flag in a field 100 that indicates that global enumeration is in use, and a partial enumeration flag field 102 that indicates that in this trie $60_{10}$, partial enumeration of the simple tag is in use. Note that as described below with reference to FIGS. 12 and 14, if multiple tags are partially enumerated, the partial enumeration flag field 102 comprise a bitmask having a bit setting for each multiple tag in use, e.g., if eight tags are present, the partial enumeration flag field 102 has eight bits reserved for determining whether partial enumeration is present on each tag.

As shown in the nodes 72 of FIG. 10, a node $76_7$ that is globally enumerated includes an enumeration bit (e.g., $104_7$) in the flags field $80_7$, followed by an array (e.g., $106_7$) setting forth the global enumeration count and the partial enumeration count (or counts), respectively, even if the partial enumeration count is zero. In contrast, the node $76_8$ does not have its enumeration bit $104_8$ set, (although it is tagged via bit $84_8$) and thus there is no enumeration count array therein. Note that if global enumeration is not active in a trie, the count array is placed in each node that otherwise would have a global enumeration count therein, however in such an event the count array does not include any global enumeration count.

Figure 11:
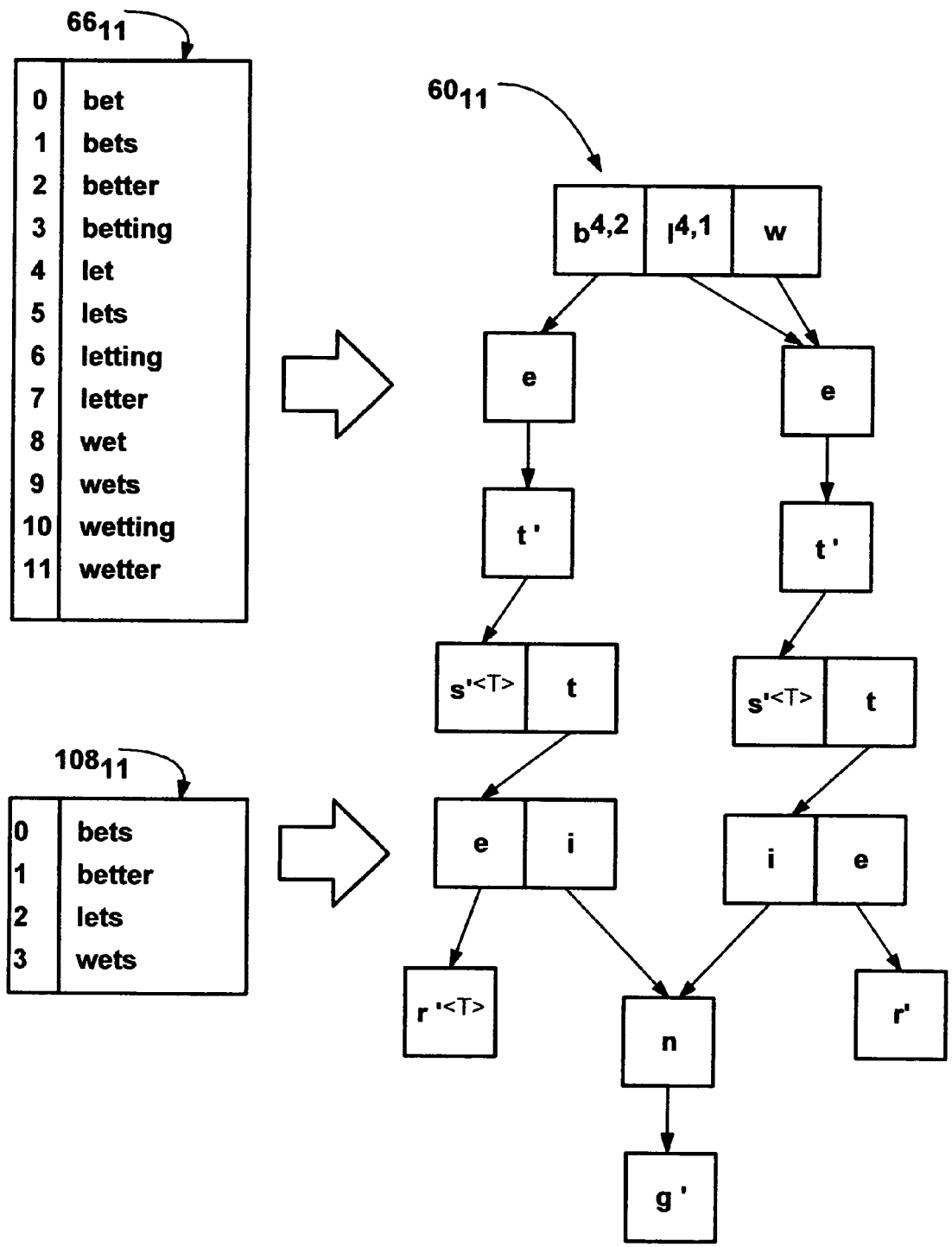
FIG. 11 is an alternative representation of a trie showing partial enumeration.

Like global enumeration, the partial enumeration counts are used to map a unique number to a tagged node, and vice-versa. The numbers are dense, e.g., if m tagged words are present, the numbers range from zero to m minus one. By way of example, FIG. 11 represents a trie $60_{11}$ wherein the nodes in the top state include a global enumeration count and a partial enumeration count of tagged nodes, e.g., the "b" node has four nodes thereunder, two of which are tagged, as represented by the superscript values (4,2) therein. A global word list $66_{11}$ and accompanying numerical values shows the valid words in the trie $60_{11}$, while a partial word list $108_{11}$ lists the tagged words in the trie. To quickly find the third tagged word (index two), the decompression engine 64 uses the partial enumeration count (the "2" in the array) to determine that the desired word is not under the "b" node, but rather is the first tagged word under the "l" node, i.e., "lets." To map from the word to the number, the decompression engine 64 sums the partial enumeration counts going backward. For example, "wets" has an index of three because it is the first tagged word under the "w" node, i.e., one, plus one tagged word under the "l" node, plus two tagged words under the "b" node, minus one (since zero-based), equaling three. Note that ending compression suffers in FIG. 11, (for example if compared to FIG. 4), since the words ending with "er" do not each have the tag.

Figure 12:
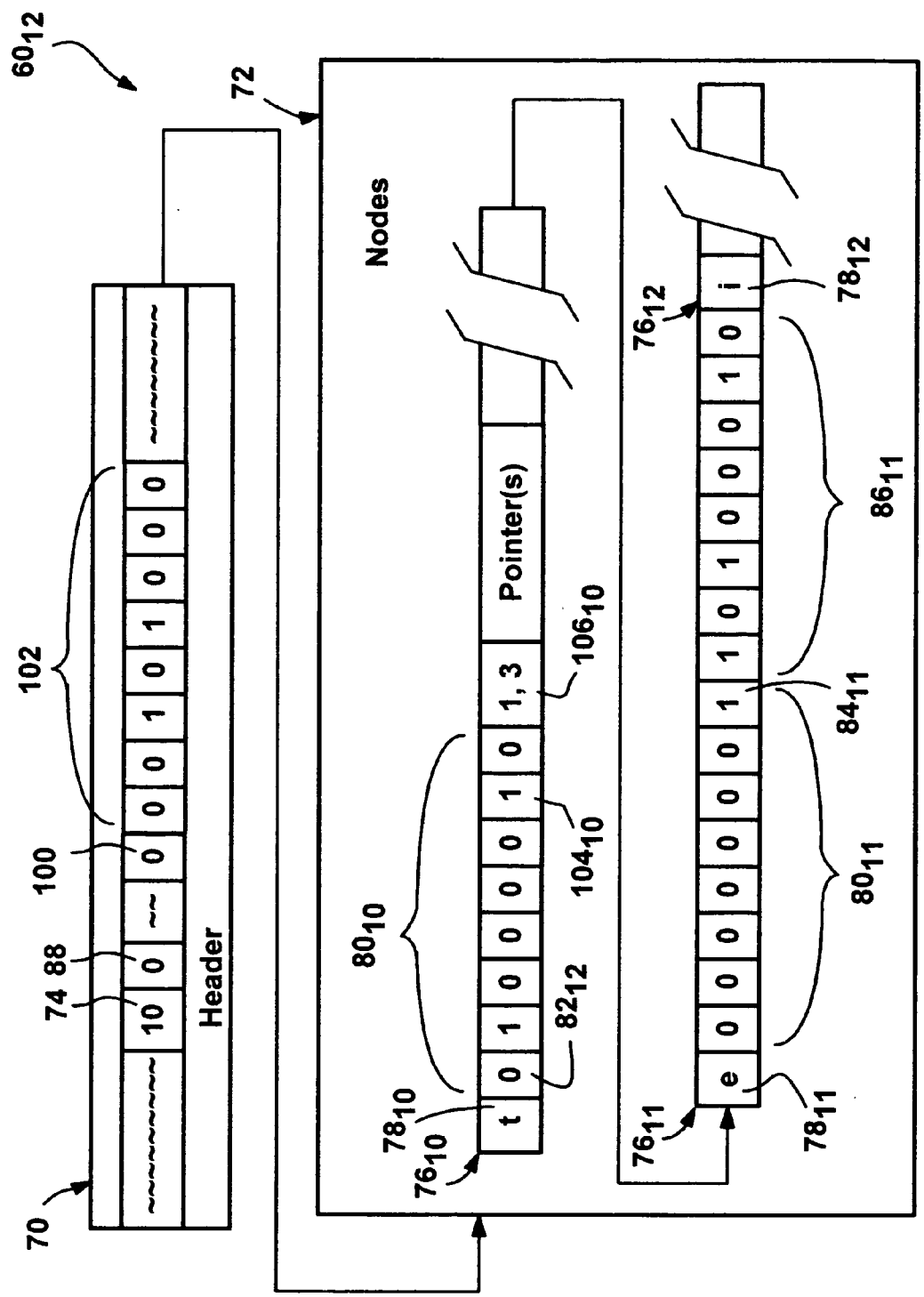
FIG. 12 is a representation of a header and two nodes of a trie data structure, and showing partial enumeration in combination with multiple tagging in accordance with one aspect of the present invention.

FIG. 12 shows partial enumeration in conjunction with multiple tagging, wherein global enumeration is not in use for this particular trie $60_{12}$. In FIG. 12, the header 70 includes information in the tag information field 74 indicating that the trie $60_{12}$ to which the header 70 belongs has multiple tagging, as well as no value associated with the tags (field 88). The header 70 also includes a global enumeration flag in a field 100 that indicates that global enumeration is not in use, and a partial enumeration bitmask field 102 that indicates that in this trie $60_{12}$, partial enumeration is used for tags three and five of the eight multiple tags available, (counting from left to right beginning with one).

As shown in the nodes 72 of FIG. 12, a node $76_{10}$ that would have a global enumeration count (if used) has the partial enumeration counts therein, and thus has its enumeration bit $104_{10}$ set and includes an array $106_{10}$ therein setting forth the partial enumeration counts (even if a partial enumeration count is zero). Note that if global enumeration was being used, the global enumeration count would be at the front of the array, however no such count is present in the array $106_{10}$ since global enumeration is not in use in this trie $60_{12}$.

As also shown in FIG. 12, the node $78_{11}$ is tagged with tags one, three and seven in the multiple tag field $86_{11}$. If this node or a node above this node $78_{11}$ includes the partial enumeration counts, the node $78_{11}$ would be counted in the count maintained for tag three. The node $78_{11}$ would not be counted in the partial enumeration count maintained for tag five, however, since the node $78_{11}$ is not tagged with tag five in its tag mask $86_{11}$.

Figure 13:
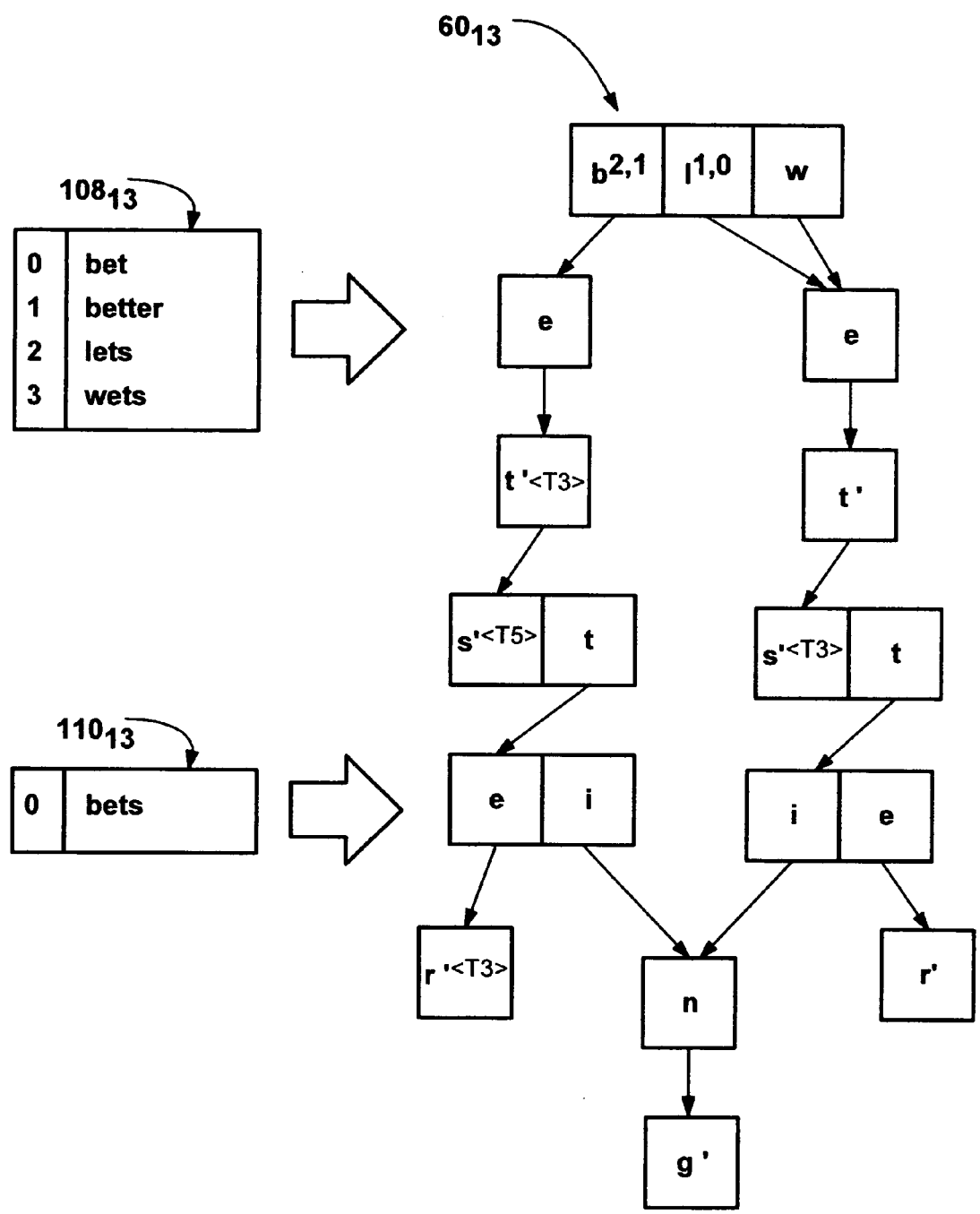
FIG. 13 is an alternative representation of a trie showing partial enumeration in combination with multiple tagging.

By way of further example, FIG. 13 represents a trie $60_{13}$ wherein the nodes in the top state include two partial enumeration counts for nodes having a three tag <T3> and for nodes having a five tag <T5>, e.g., the "b" node has four nodes thereunder, two of which are tagged with <T3> and one with <T5>, as represented by the superscript values (2, 1) therein. Partial word lists $108_{13}$ and $110_{13}$, shown along with their associated numerical values, list the words tagged with <T3> and <T5> in the trie $60_{13}$, respectively. Mapping from the index to the word is the same as described above, except that the appropriate partial enumeration count is used depending on the tag to which the index corresponds. For example, to quickly find the fourth word (index three) tagged with <T3>, the decompression engine 64 uses the first of the partial enumeration counts to determine that the desired word is not under the "b" node or the "l" node, but is the first word tagged with <T3> under the "w" node, i.e., "wets." To map from the word to the number for an appropriate tag, the decompression engine 64 sums the tag's corresponding partial enumeration counts going backward as described above.

It should be noted that it is feasible to use partial enumeration on logical combinations of multiple tags. For example, one of the partial enumeration counts may represent the number of nodes having both tag three and tag six therein, another the number of nodes having either tag 1 or tag 2 therein, and another the number of nodes having tag 4 and tag 7 therein but not if tag 8 is also therein. As can be appreciated, virtually any combination is possible as long as the decompression engine 64 knows or is made aware of the scheme (e.g., via the header 70) that was used to store the trie information.

Figure 14:
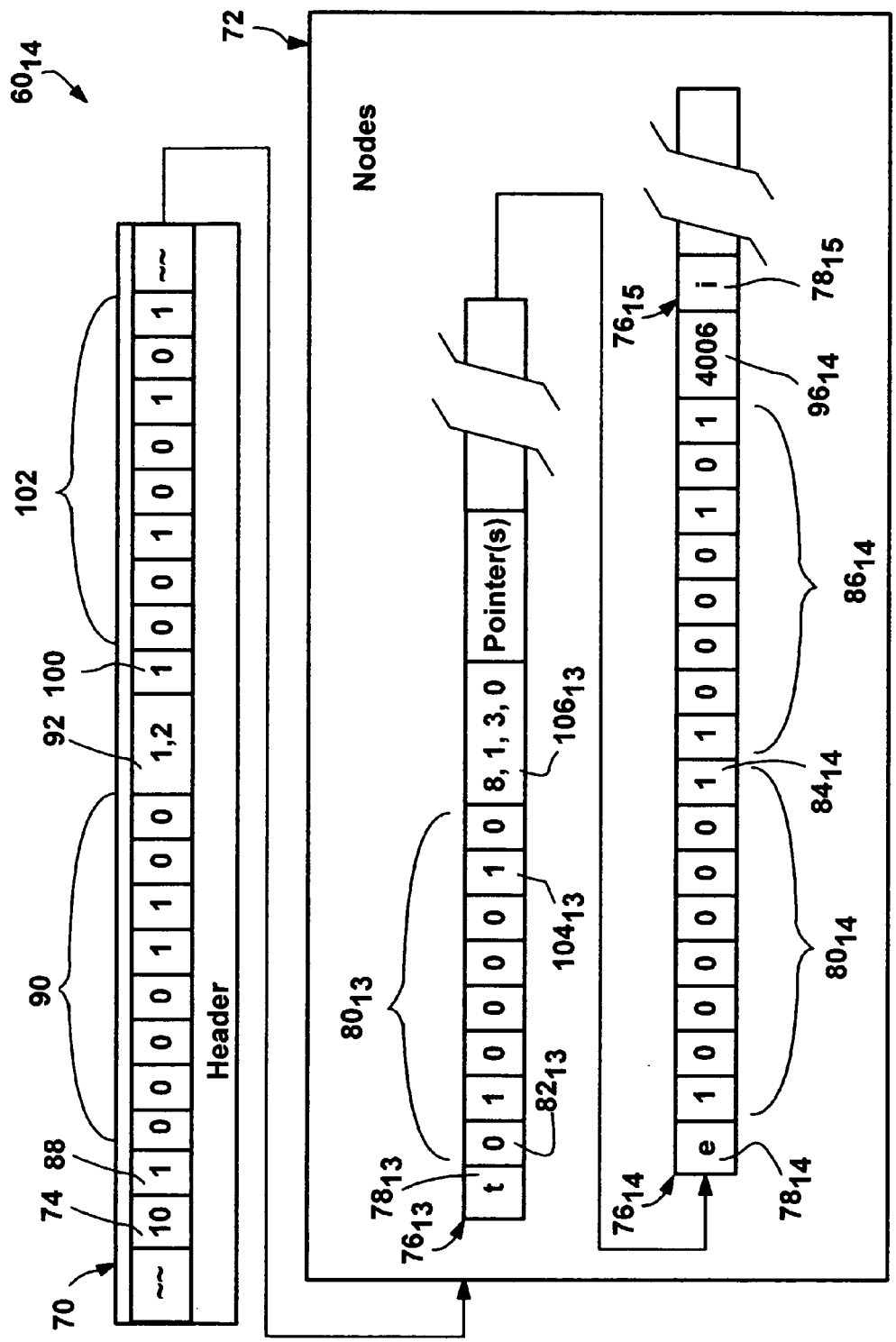
FIG. 14 is a representation of a header and two nodes of a trie, and showing global and partial enumeration in combination with multiple tagging with values in accordance with aspects of the present invention.

Lastly, various aspects of the present invention may be combined using the above-described framework as desired to attach information to some or all the words of a trie. For example, to summarize the various aspects and features described above, FIG. 14 shows a trie $60_{14}$ wherein multiple tagging with values is combined with global and partial enumeration. In FIG. 14, the header 70 indicates that multiple tagging is present via field 74, and that values are attached via field 88. Via value mask field 90, it is known that tags five and six have values associated therewith, and field 92 indicates that the value sizes for tags five and six are one and two bytes in length, respectively. Further, in FIG. 14, the field 100 indicates that global enumeration is present in the trie $60_{14}$, while field 102 indicates that tags three, six and eight are partially enumerated.

In FIG. 14, the node $76_{13}$ is enumerated, as indicated by the set enumeration bit $104_{13}$ in the flags field $80_{13}$. As a result, the enumeration count array $106_{13}$ is present in this node $60_{14}$. In the node $76_{14}$ the tag bit $84_{14}$ is set in the flags field $80_{14}$, and consequently the tag mask $86_{14}$ is present in the node $76_{14}$. The tag mask $86_{14}$ specifies that the node $76_{14}$ is tagged with tags one, six and seven, and since tag six has an associated value with a two-byte length, (known via header fields 90 and 92), the node $76_{14}$ includes a field $96_{14}$ that provides a value attached to this node $76_{14}$, shown herein as equal to 4006.

As can be seen from the foregoing detailed description, there is provided an improved method and system for attaching information to words of a trie data structure, and for using that information. The method and system are highly flexible, extensible and efficient for attaching information to words of tries.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A method for identifying trie data in a trie based on multiple tags, the trie including a header section containing a tag information field and a node section containing a plurality of nodes, each node containing a tag bit, the method comprising:
   receiving an input;
   determining a first value of the tag information field in the header;
   based on the first value, determining a second value of a tag bit in a node of the node section, the node corresponding to the input;
   based on the first value and the second value, identifying whether a tag mask field is present in the node, the tag mask field including a plurality of bits in the node wherein at least one bit in the plurality of bits of the tag mask field is set;
   if the tag mask field is present, identifying at least one set bit and a location of the at least one set bit in the plurality of bits of the tag mask field;
   generating trie data corresponding to the node based on the identified at least one set bit in the plurality of bits of the tag mask field; and
   outputting the generated trie data.

2. The method of claim 1 wherein determining the first value of the tag information field comprises identifying the first value as indicating that the node contains multiple tagging and determining the second value of the tag bit includes identifying the second value as indicating that the tag mask field is present in the node.

3. The method of claim 1 wherein the header includes a value mask field, the method further comprising:
   comparing the including at least one set bit with a bit in the value mask field in the header corresponding to the location of the at least one set bit in the tag mask field in the node;
   based on the comparing, identifying a size of the value associated with the trie data, the step of outputting including outputting the identified size of the value.

4. The method of claim 3 wherein the number of bits in the value mask field and the number of bits in the tag mask field are the same.

5. The method of claim 3 wherein the at least one set bit corresponds to a value associated with the trie data.

6. The method of claim 5 wherein the header further includes a value array information field, the step of identifying a size of the value associated with the trie data including:
   determining a value of the value array information field; and
   setting the size of the value associated with the trie data equal to the value of the value array information field.

7. The method of claim 6 further comprising identifying a value of the trie data corresponding to the at least one identified set bit, the step of generating trie data comprising including the value of at least one value field.

8. The method of claim 7 wherein the node further includes the at least one value field corresponding to the at least one bit, the identifying a value of the trie data corresponding to the at least one identified set bit including determining a value of the at least one value field of the node.

9. The method of claim 1 wherein the step of identifying the tag mask field in the node further includes identifying presence of the tag mask field based on the setting of the tag bit.

10. The method of claim 9 wherein the generated trie data based on a pattern of values of the plurality of bits of the tag mask field.

11. The method of claim 10 wherein the generated trie data includes a word in the trie.

12. The method of claim 1 wherein the step of identifying the tag mask field including determining a presence of the tag mask field based on a value of the tag information field and a value of the tag bit.

13. The method of claim 12 further including determining a number of tags present in the trie based on the tag mask field by summing the number of one bits in the tag mask field of the node.

14. The method of claim 13 wherein determining the second value of the tag bit includes identifying in the second value as indicating that the tag mask field is not present in the node; and the step of identifying a tag mask field based on the first value and the second value includes identifying the absence of the tag mask field based on the first value and the second value, the second value being determined as being unset.

15. The method of claim 12 further including identifying additional information to add to the node by partial enumeration, the partial enumeration including:

counting each node in the plurality of nodes that are tagged;

generating an array of partial enumeration counts;

generating a map between a unique number and a tagged node based on the array.

* * * * *